US008272671B2

(12) United States Patent
Becker et al.

(10) Patent No.: US 8,272,671 B2
(45) Date of Patent: Sep. 25, 2012

(54) FLUID LINE CONNECTOR

(75) Inventors: Aaron Becker, Atlanta, GA (US); Jim Resutek, Romeo, MI (US); Myron Stein, Laguna Niguel, CA (US); Thomas M. Wall, Nashville, TN (US)

(73) Assignee: AirSept, Inc., Atlanta, GA (US)

( * ) Notice: Subject to any disclaimer, the term of this patent is extended or adjusted under 35 U.S.C. 154(b) by 232 days.

(21) Appl. No.: 12/524,894

(22) PCT Filed: Jan. 30, 2008

(86) PCT No.: PCT/US2008/001197
§ 371 (c)(1),
(2), (4) Date: Feb. 19, 2010

(87) PCT Pub. No.: WO2008/094576
PCT Pub. Date: Aug. 7, 2008

(65) Prior Publication Data
US 2010/0140928 A1 Jun. 10, 2010

Related U.S. Application Data

(60) Provisional application No. 60/887,232, filed on Jan. 30, 2007, provisional application No. 60/971,725, filed on Sep. 12, 2007, provisional application No. 61/004,657, filed on Nov. 29, 2007.

(51) Int. Cl.
*F16L 21/06* (2006.01)
(52) U.S. Cl. ......... 285/323; 285/249; 285/342; 285/343
(58) Field of Classification Search .................. 285/249, 285/323, 342, 343
See application file for complete search history.

(56) References Cited

U.S. PATENT DOCUMENTS

| | | | | |
|---|---|---|---|---|
| 695,071 | A | * | 3/1902 | Mooney .......................... 285/343 |
| 2,328,298 | A | * | 8/1943 | Santhoff ........................ 285/249 |
| 2,398,618 | A | * | 4/1946 | Chavayda ...................... 285/342 |
| 2,470,538 | A | * | 5/1949 | Wolfram et al. .............. 285/249 |
| 2,951,715 | A | * | 9/1960 | Bauer ............................ 285/249 |
| 3,441,297 | A | * | 4/1969 | Koski ............................ 285/342 |
| 3,830,532 | A | | 8/1974 | Roberts |
| 4,043,576 | A | * | 8/1977 | Reich et al. .................... 285/343 |
| 4,062,572 | A | * | 12/1977 | Davis ............................ 285/249 |
| 4,627,644 | A | * | 12/1986 | Ekman .......................... 285/249 |
| 5,655,796 | A | | 8/1997 | Bartholomew |

(Continued)

OTHER PUBLICATIONS

International Search Report—PCT/US2008/01197.

(Continued)

*Primary Examiner* — David E Bochna
(74) *Attorney, Agent, or Firm* — Womble, Carlyle, Sandridge & Rice, LLP

(57) ABSTRACT

A connector connects the ends of two fluid lines, it is useful for connecting and sealing the ends of refrigerant lines in an automotive air conditioner. A resilient seal is disposed about the end of a fluid line within each end of the passageway and a combination slotted ferrule and sealing ring member formed with a sealing ring portion and a ferrule portion is captured between the seal and a compression nut treaded onto the end of the body. When the nut is tightened onto the end, it causes the ferrule portion to deform and collapse inwardly to grasp and hold the fluid line securely in place and simultaneously drives the sealing ring portion against the seal to compress the seal, which expands to form a fluid-tight seal around the end of the fluid line.

18 Claims, 14 Drawing Sheets

U.S. PATENT DOCUMENTS

| | | | |
|---|---|---|---|
| 6,241,291 B1 * | 6/2001 | Hui-Chen | 285/249 |
| 6,488,318 B1 * | 12/2002 | Shim | 285/342 |
| 6,702,336 B1 * | 3/2004 | Chelchowski et al. | 285/343 |
| 6,938,437 B2 | 9/2005 | Velez et al. | |

OTHER PUBLICATIONS

Written Opinion—PCT/US2008/01197.

* cited by examiner

FLUID LINE CONNECTOR

RELATED APPLICATIONS

The benefit of U.S. provisional patent application Ser. Nos. 60/887,232 filed Jan. 30, 2007; 60/971,725 filed Sep. 12, 2007; and 61/004,657 filed Nov. 29, 2007 is hereby claimed. The disclosures of these provisional patent applications are hereby incorporated by reference.

TECHNICAL FIELD

This invention relates generally to connectors for coupling and sealing refrigerant or other fluid lines and more specifically to a connector providing a fluid tight seal between two refrigerant lines in an automotive air conditioning system.

BACKGROUND

In many equipment service applications, it is sometimes necessary to splice the ends of two fluid lines together with a fluid-tight connection. This is particularly true in the service and repair of automotive air conditioning systems, where refrigerant lines, which usually are made of aluminum, have to be cut for various reasons such as, for instance, to remove a damaged or leaking section of the line. Many times, this has necessitated complete removal of the cut line and replacement with a new one, which can be expensive and inefficient. It also is desirable to install filters in refrigerant lines to filter out debris and small metal particles from the refrigerant. Couplers have been available to couple free ends of cut fluid lines together, but have not been completely satisfactory. Installing small thimble filters in an air conditioning refrigerant line also is known. However, a need exist for a fluid line connector, and particularly a connector for the refrigerant lines of automotive air conditioning systems, that is simple and fool-proof to install, that forms a reliable long-term fluid-tight seal around the ends of the coupled fluid lines, that provides the option of installing a refrigerant filter in-line with the refrigerant flow if desired, and that is modular and thus economical. It is to the provision of such a connector that the present invention is primarily directed.

SUMMARY

Briefly described, the invention is a connector or splice or coupler for connecting the ends of two fluid lines with a fluid-tight connection. The connector comprises a housing having a first end for receiving a first fluid line and a second end for receiving a second fluid line. Each of the first and second ends has a seal, a compression or sealing ring, a clamping ring, and a nut for securing a fluid line in fluid tight engagement with the connector. In one embodiment, the seal is a resilient annular rubberized seal, which may have interior ribs, that is compressed around a fluid line when the nut is tightened to compress the seal with the sealing ring. In another embodiment, the clamping ring is an annular locking ring having an angled bore that is disposed around the fluid line inboard of the nut. In this embodiment, tightening the nut rotates the locking ring until the edges of its angled bore dig into the fluid line to lock it mechanically in the connector. In yet another embodiment, a combined ferrule and sealing ring member is disposed between the seal and the nut and the ferrule portion is slotted. In this embodiment, tightening of the nut simultaneously compresses the sealing ring portion against the seal to expand and compress its walls around the fluid line forming a fluid-tight seal and also collapses the slotted ferrule portion inwardly against the fluid line to lock the fluid line mechanically in the connector. In this later embodiment, a service technician need only slip the nut and the combination ferrule and sealing ring member onto the end of the fluid line, insert the fluid line into the body of the connector through the rubberized seal, and tighten the nut onto the threaded end of the body. These simple actions form both a fluid-tight seal by compressing the seal around the fluid line and a mechanical lock locking the fluid line in place.

A fluid line connector is now provided that addresses successfully and reliably the problems and shortcomings of the prior art. The invention will be better understood and appreciated upon review of the detailed description set forth below when taken in conjunction with the accompanying drawing figures, described briefly blow. According to common practice, the various features of the drawings may not be drawn to scale. Dimensions and relative sized of various features and elements in the drawings may be shown enlarged or reduced to illustrate more clearly the embodiments of the invention.

DETAILED DESCRIPTION

Figure 1:
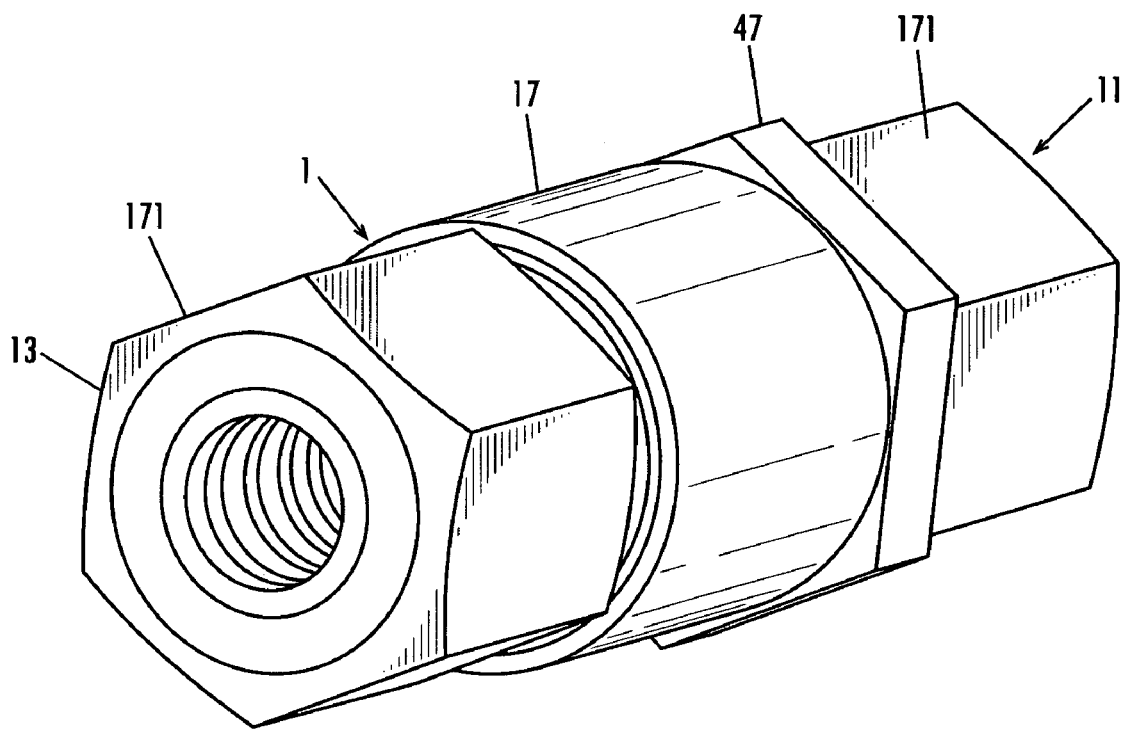
FIG. 1 is a perspective view of a fluid line connector according to a first embodiment of the invention.

Referring now in more detail to the drawing figures, FIG. 1 is a perspective view of a fluid line connector 1 according to a first embodiment of the invention. The connector 1 is used to couple together the ends of two fluid lines such as, for example, refrigerant lines of an automotive air conditioning system. The end of one fluid line is coupled to first end 11 of the connector 1 and the end of the second fluid is coupled to the second end 13 of the connector. In the illustrated embodiments the fluid lines likely are metallic refrigerant lines made of aluminum, copper, or the like, but it is understood that fluid lines fabricated of other materials and fluid lines for conveying fluids other than refrigerant are contemplated. The connector 1 has a housing 17, which has threaded ends onto which respective compression nuts 171 are threaded. A hex-shaped shoulder 47 is formed in the housing to allow the housing to be held with a wrench as the compression nuts 171 are tightened with a separate wrench.

Figure 2:
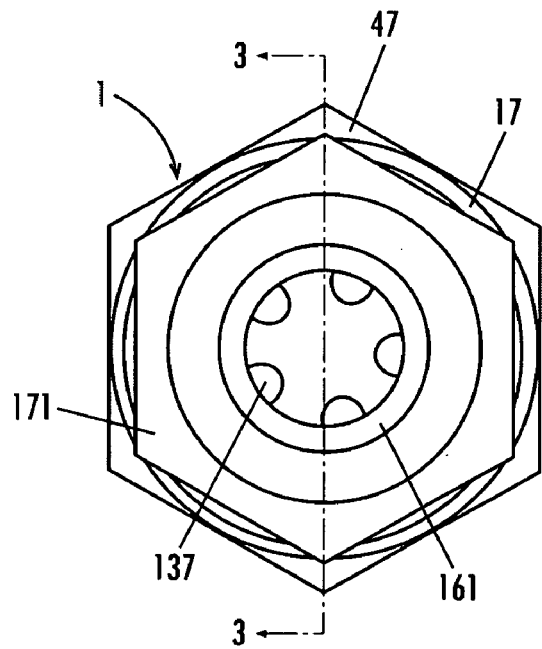
FIG. 2 is an end view of the connector of FIG. 1.
Figure 3:
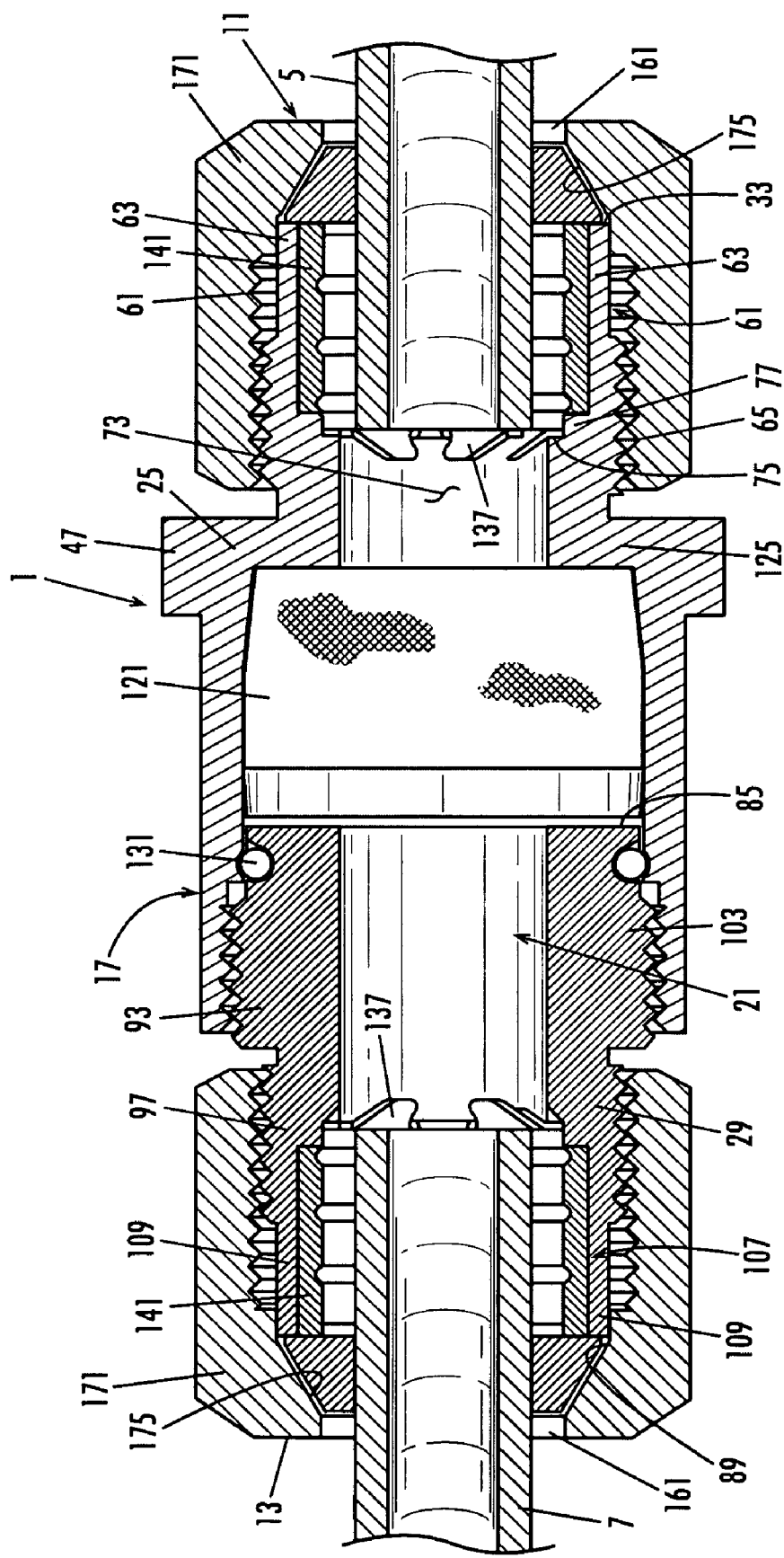
FIG. 3 is a sectional view taken along 3-3 of FIG. 2.

As shown in FIGS. 2 and 3, the housing 17 has a central passageway or bore, generally indicated 21, for the passage of fluid between the end of a first fluid line 5 and the end of a second fluid line 7. In the illustrated embodiment, the housing 17 is a two-piece housing comprising a main body 25 and an end cap 29 with the body 25 and the end cap 29 being threadably connected. However, the housing 17 can be made up of components connected together by other means such as by a weld, a press-fit, or the like. Also, the housing 17 can be machined or otherwise formed as a single unitary piece if desired. The threaded two-piece configuration in the particular embodiments of FIGS. 2 and 3 facilitates the placement in the housing 17 of a fluid filter 121 for filtering debris from the fluid flow as it passes through the housing, as described in more detail below.

Figure 4:
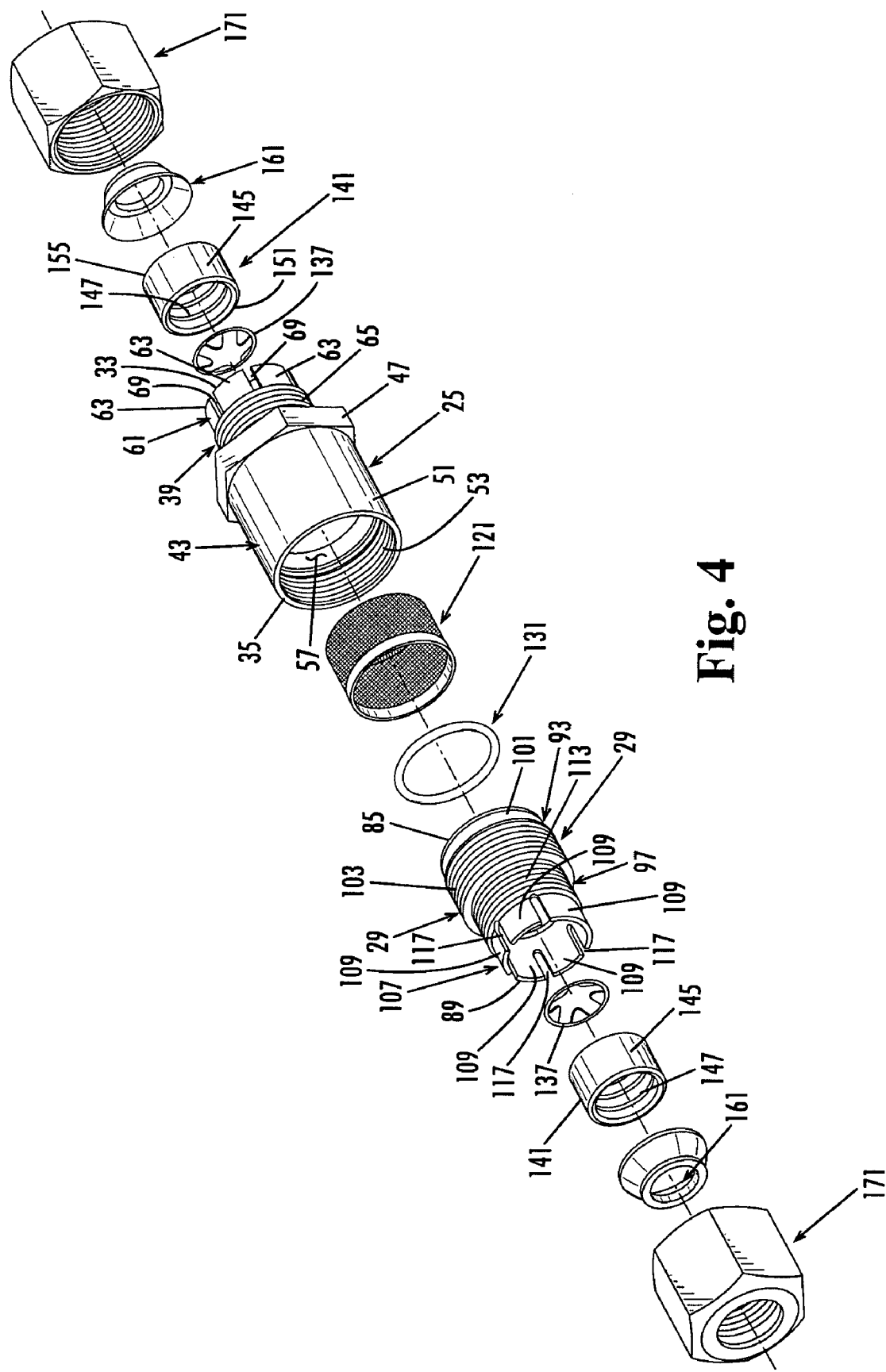
FIG. 4 is an exploded perspective of the connector of FIG. 1.
Figure 5:
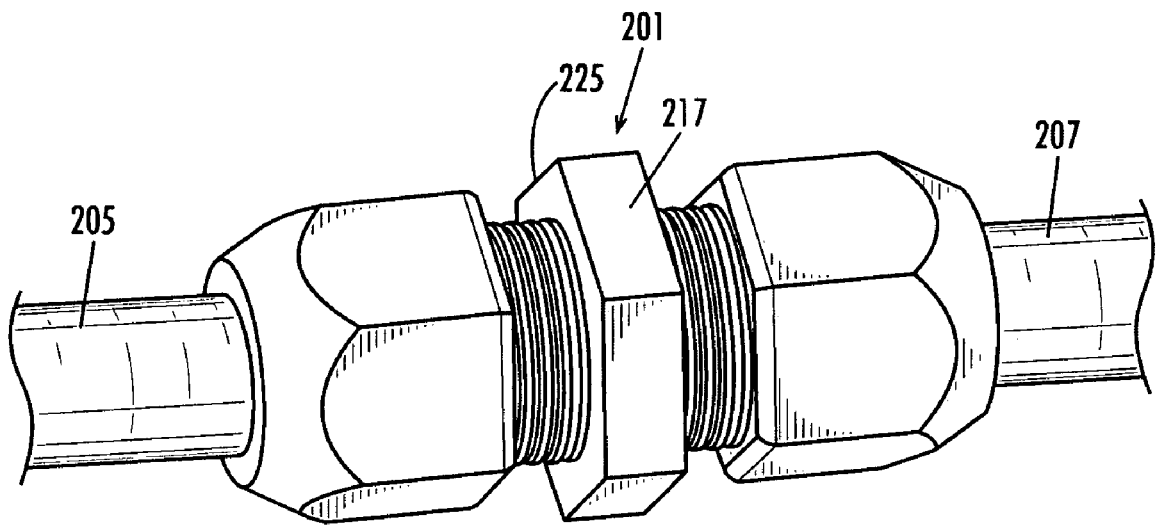
FIGS. 5-14 are various views of a connector according to a second embodiment of the invention and/or views of various components and individual elements of the connector of the second embodiment.
Figure 6:
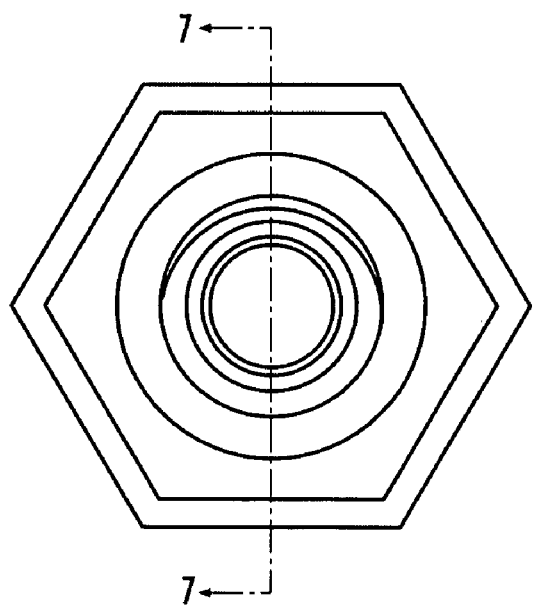

As shown in FIG. 4, the body 25 is generally cylindrical and has a first axial end 33 and a second axial end 35. The body 25 includes a first socket 39 at the first end 33 for receiving the end of the first fluid line 5 and a second socket 43 at the second end 35. The body 25 is formed with an exterior shoulder 47 between the first and second sockets 39, 43, which has a hex-head profile to receive a wrench for holding the body while nuts 171 are tightened with a separate wrench. In the illustrated embodiment, the second socket 43 has a larger diameter than the first socket 39. The second socket 43 has a smooth cylindrical outer surface 51 and a partially threaded inner surface 53 defining an inner bore 57 of the second socket.

The first socket 39 of the body 25 includes a clamp 61 in the form of a plurality of axially projecting clamping members 63 at its first axial end. A threaded portion 65 of the first socket 39 is disposed between the clamp 61 and the shoulder 47. The clamping members 63 are separated by spaced-apart, axial notches 69 extending from the first end 33 of the body 25 to the threaded portion 65. As discussed below in more detail, each of the clamping members 63 is capable of bending or being collapsed radially inward to effect a tight mechanical lock on the first fluid line 5 securing it firmly within the connector 1. As shown in FIG. 3, the first socket 39 has an axial bore 73 defined by an inner surface that includes a first annular shoulder 75 and a second annular shoulder 77 with the shoulders having different diameters.

The end cap 29 is generally cylindrical and has a first end 85 and a second end 87. The end cap 29 includes a first open-ended male portion 93 at the first end 85 and a second open-ended socket 97 at the second end 89. In the illustrated embodiment, the male portion 93 has a larger outer diameter than the socket 97. The male portion 93 has an external surface that includes an annular groove 101 near the first end 85 of the end cap 29 and a threaded portion 103 between the annular groove and the socket. The annular groove is sized to receive an O-ring 131 for sealing the end cap within the body when the two are threaded together as shown in FIG. 3. The male portion 93 of the end cap 29 is sized to threaded into the axial bore 57 of the second socket 43 of the body 25.

The socket portion 97 of the end cap 29 is of similar construction as the first socket 39 of the body 25. Specifically, the socket portion 97 has a clamp 107 in the form of a plurality of axially extending clamping members 109 and a threaded portion 113 adjacent the male portion of the end cap. The clamping members 109 are separated by spaced-apart notches 117 extending axially from the second end 89 of the end cap 29 to the threaded portion 113. As with the clamping members 63 of the body 25, the clamping members 109 of the end cap are capable of bending or being collapsed radially inward to effect a secure clamping force on the second fluid line 7 to hold the fluid line securely within the connector.

The connector 1 in this embodiment includes a filter 121 placed in the axial bore 59 of the body 25. The filter 121 is secured between the first end 85 of the end cap 29 and a shoulder 125 (FIG. 4) in the inner surface of the body 25. The filter 121 may be a mesh screen basket-type filter or a filter of any other suitable design and construction. An O-ring 131 is mounted on the annular groove 101 of the male portion 93 of the end cap 29 to prevent the flow of fluid between the body 25 and the end cap. The O-ring 131 can be made from any suitable material including rubber, HNBR elastomer, nitrile, neoprene, or otherwise so long as a good seal is created. Further, the O-ring 131 can be otherwise suitably sized and shaped than shown in the drawings.

The first socket 39 at the first axial end 33 of the body 25 and the socket 97 at the second axial end 89 of the end cap 29 are similarly constructed and comprise similar components so as to connect the first fluid line 5 and the second fluid line 7 to the housing in a similar manner. Accordingly, like reference numbers represent identical elements for the attachment of the first fluid line 5 to the first socket 39 and the attachment of the second fluid line 7 to the socket 97. In other embodiments, the fluid lines 5 and 7 can be respectively connected to the connector 1 in a different manner. Further, more than two fluid lines 5 and 7 can be connected to the connector 1 in a T or X configuration of the connector within the scope of this invention.

A retainer 137 is received in the first socket 37 of the body 25 in this embodiment and is held between the first annular shoulder 75 and an end of the fluid line 5. The retainer 137 is typically constructed of metal (e.g., aluminum, steel, or an appropriate alloy) or other suitable material. The retainer 137 provides a stop that positions the fluid line 5 in a fixed axial position in the first end 11 of the connector. Further, the retainer 137 allows fluid lines of varying diameters to be coupled together using a standard diameter coupler body.

An annular or cylindrical seal 141 is received in the first socket 39 of the body 25. The seal 141 has an outer surface 145 adjacent the clamping members 63 and an inner surface 147 that receives the fluid line 5. The inner surface of the seal 141 may be formed if desired with an array of spaced annular ribs that are pressed tightly and form seals around the fluid line when the seal is compressed in place. The seal has a first axial end 151 that abuts the second shoulder 77 in the first socket 33 and a second end 155. The seal 141 is constructed of resilient material, e.g., HNBR elastomer, rubber, nitrile, neoprene, or any other suitable material, to provide a fluid-tight seal between fluid line 5 and the body 25 when the seal is compressed around the fluid line.

Figure 3A:
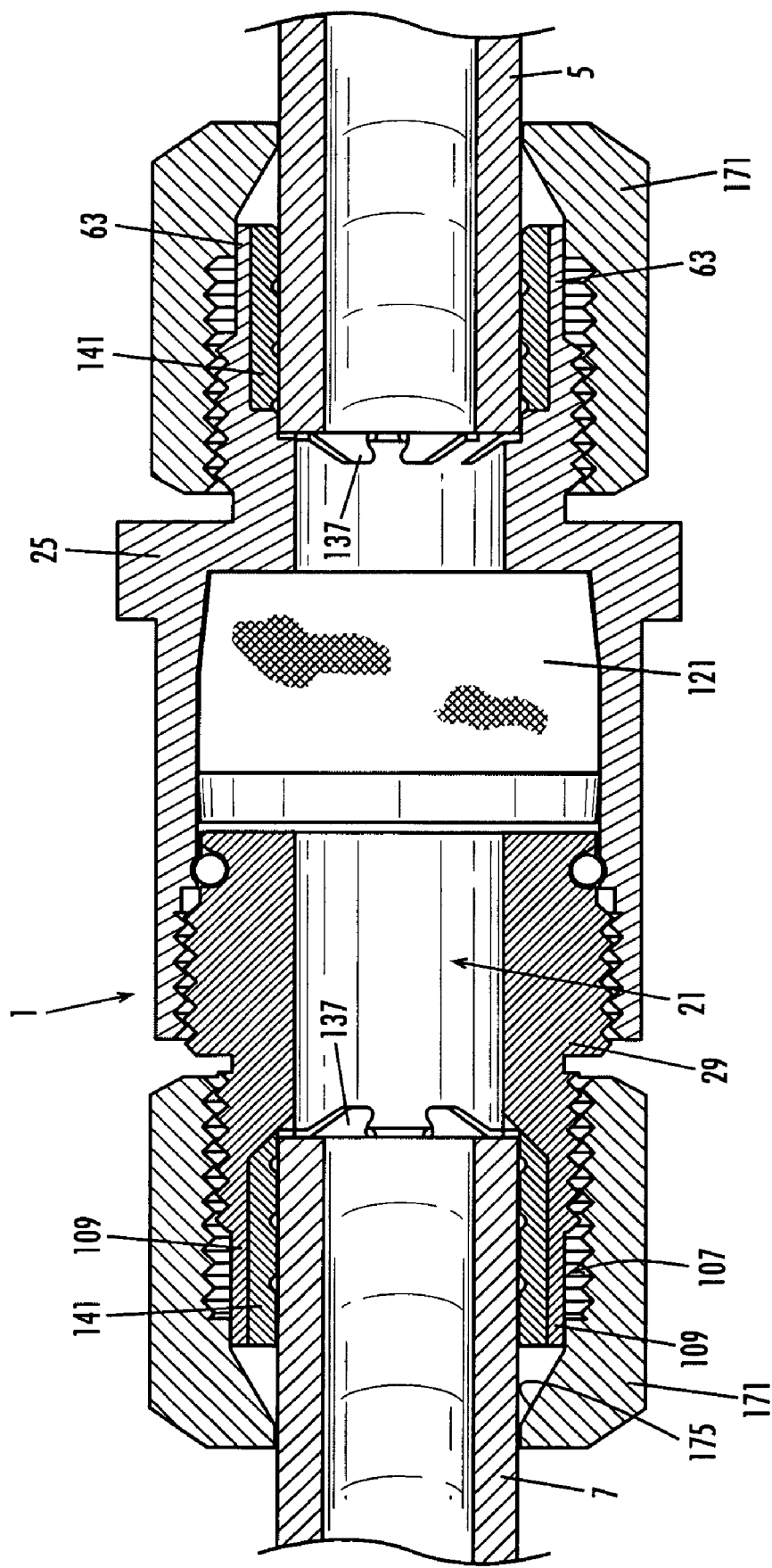
FIG. 3A is a view similar to FIG. 3 but showing an alternative embodiment of the connector.

In the embodiment of FIG. 3, a reducer 161 resides adjacent the axial end 33 of the body 25 and has an opening 163 sized to fit snuggly around the outer diameter of the fluid line 5. The reducer 161 is configured to be pressed against the second end 151 of the seal 141 when the nut 171 is tightened to compress the seal 141 around the fluid line. The reducer 161 may be omitted when larger fluid line sizes are used with the connector 1 as contemplated by the invention. For example, FIG. 3A shows the connector 1 with first and second fluid lines 5 and 7 of a larger diameter and with the reducer 161 omitted from the connector. In this figure, the ends of the larger diameter fluid lines bottom out on one of the annular shoulders formed around the interior of the passageway in the body rather than on the retainer 137.

Each of the fluid lines 5 and 7 is secured and sealed in the housing 17 by a nut 171 in the form of a hex-head compression nut. The nut 171 surrounding the first fluid line 5 is threadably attached to the threaded portion 65 of the first socket 39 of the body 25. The interior surface of the nut 171 is formed with an angled frustroconic section or shoulder that contacts the reducer 161 when the nut is threadably attached to the first socket 39. Advancement of the nut 171 on the threaded portion 65 causes the clamping members 63 to engage the frustrocoinic shoulder, which urges them to bend or compress radially inwardly and apply a mechanical compression around the outside of the fluid line 5 to lock and secure the fluid line in place. In addition, the reducer is driven against the seal 141 compressing it in the axial direction, which cases its walls to expand and form a fluid-tight seal around the fluid line. Thus, the compression force applied by the clamping members 63 to the seal creates a fluid-tight seal between the fluid line 5 and the first socket 39 of the body 25. Also, the compression force mechanically locks the fluid line in place within the connector 1.

It is understood that the second fluid line 7 is held in place in a fluid tight seal at the second end 13 of the connector 1 in a similar manner and with similar components as described above with respect to the first fluid line 7. That is, a nut 171 at the second end 13 of the connector deforms or collapses the clamping members 109 radially inward to lock the fluid line in place with mechanical compression and causes the sealing member to compress the seal and create a fluid-tight seal around the second fluid.

In alternative embodiments of the invention, the connector 1 may be modified for use as a filterless splice. In this configuration the filter 121 may be eliminated and the housing 17 shortened. The two fluid lines 5 and 7 can be sealingly attached to the housing 17 in the same manner as the first embodiment (e.g., with clamps 61 and 107, seals 141, and nuts 171). The connector 1 may be used to connect two fluid lines of the same diameter or two fluid lines of a different diameter as contemplated by the invention.

In another alternative embodiment, the connector 1 is modified for use as a "T" connector or "X" connector. In such an embodiment, the filter 121 may be eliminated and the housing 17 modified to include at least one other port that may, for example, be sealed by a threaded plug or be configured to receive a third fluid line as described above. Where a plug is provided, removal of the threaded plug reveals an access point for a technician, who may, for example, use the port to charge a refrigeration system of which the fluid lines are a part. If one plug or additional fluid line connector is provided the connector 1 may be designated a "T" connector. Where two additional plugs or fluid line connectors are provided the connector 1 may be designated an "X" connector. It is understood that more than two plugs or fluid line connectors can be added to the housing 17 without departing from the scope of this invention.

Figure 7:
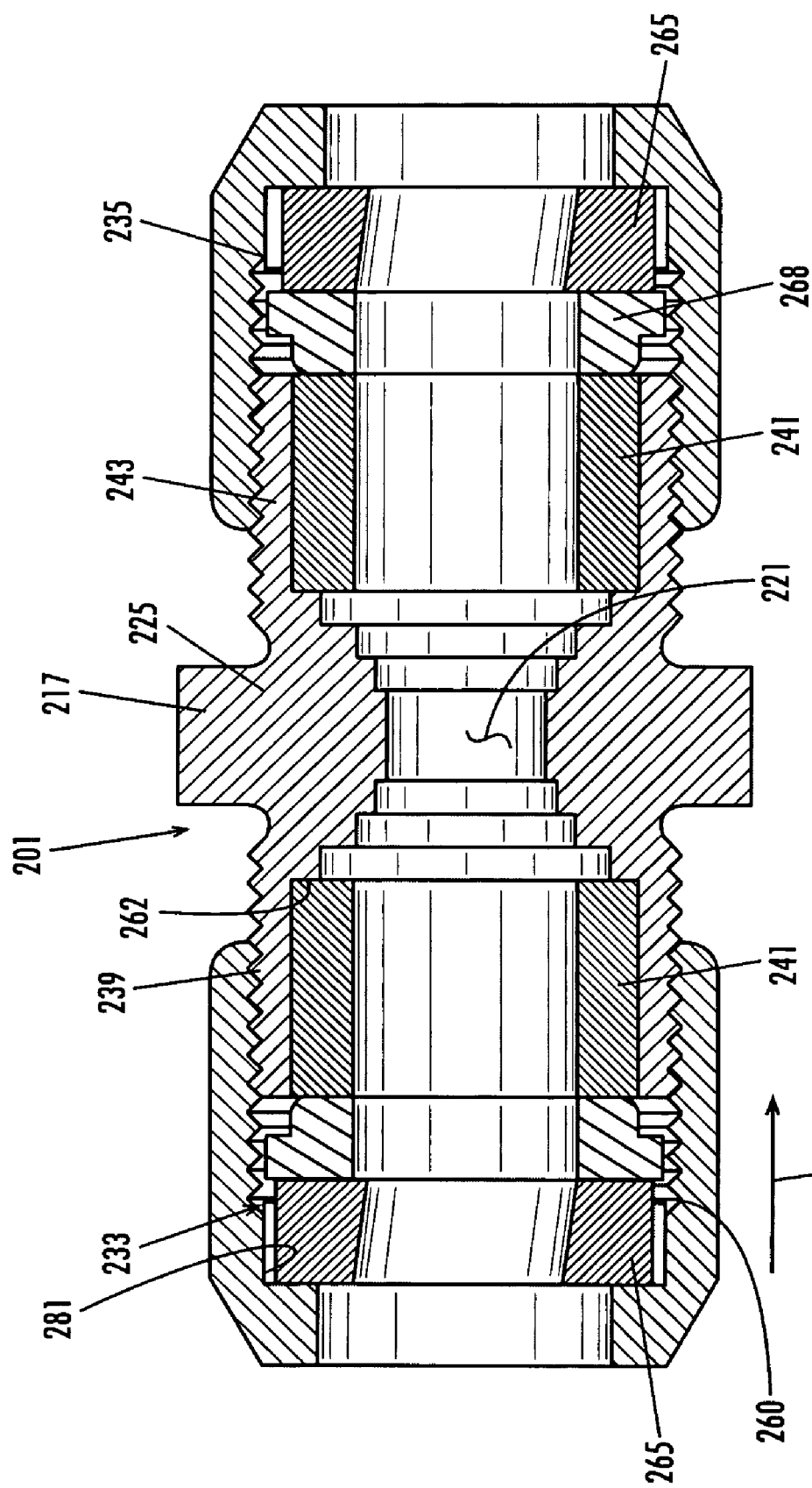
Figure 8:
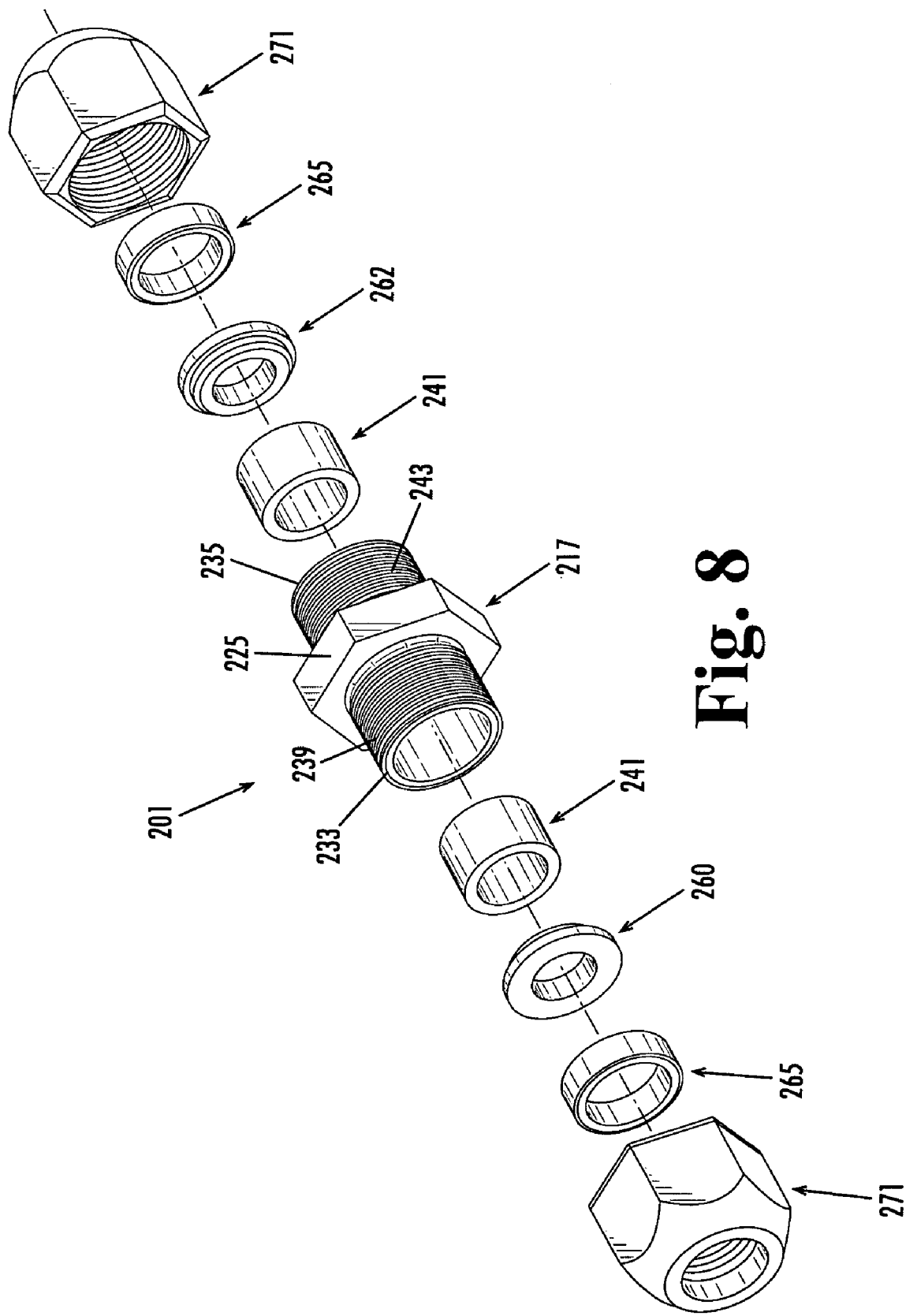

FIGS. 5-14 illustrate a connector 201 of a second embodiment of the invention. The connector 201 is used in a similar manner as the connector 1 of the first embodiment in that the connector is used to allow fluid communication between the ends of two fluid lines (e.g., refrigerant lines 205, 207) similar to the fluid lines 5, 7 of the first embodiment. In the embodiment of FIGS. 5-14, the connector 201 includes a housing 217 having a body 225 with a central bore 221 for the passage of fluid between the first fluid line 205 and the second fluid line 207. As shown in FIG. 7, the housing 217 is a one-piece housing having a first end 233 and a second end 235. The housing 217 has a first socket 239 at the first end 233 and a second socket 243 at the second end 235. The connector 201 is a line splice with the body 225 being one-piece and sized and shaped to connect the two fluid lines 205, 207. However, the connector 201 could be otherwise shaped and arranged to have a body, housing, or other components to accommodate a filter such as the mesh screen 121 of the connector 1 of the first embodiment.

In the illustrated embodiment, the first fluid line 205 is coupled within the first socket 239 and the second fluid line 201 is coupled within the second socket 243 to allow the flow of fluid from one fluid line to the other via the central bore 221. An annular seal 241 is received in the first socket 239 of the housing 217 and is disposed around the first fluid line 205. The annular seal 241 may fabricated of a resilient material similar to the seal 141 of the first embodiment or the seal may comprise other suitable materials.

A sealing ring 260 is placed around the first fluid line 205 outboard of the annular seal 241 in the first socket 239. The sealing ring 260 is configured to be urged against and to compress the annular seal 241 against shoulder 262 in the body 225 when the nut 271 is tightened. As annular seal 241 is compressed, its walls expand to form a fluid-tight seal between the fluid line 205 and the body 225. In one embodiment, the sealing ring 260 is a rigid material such as metal (e.g., 303 SS), or rigid plastic, or other suitable material.

Figure 9A:
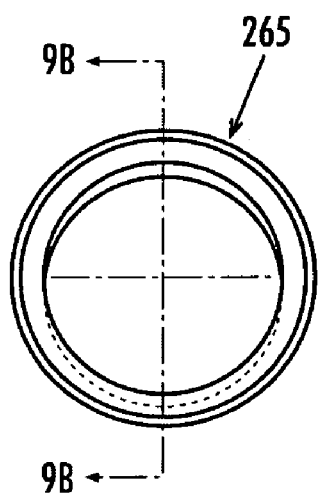
Figure 9B:
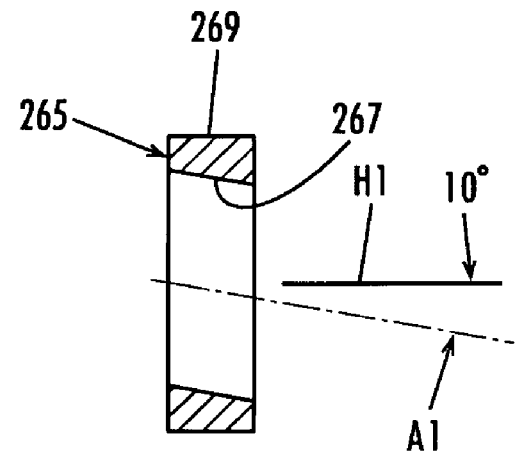
Figure 9C:
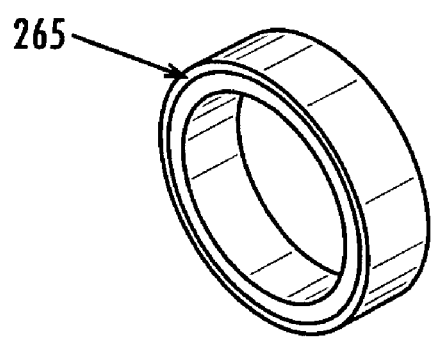
Figure 10:
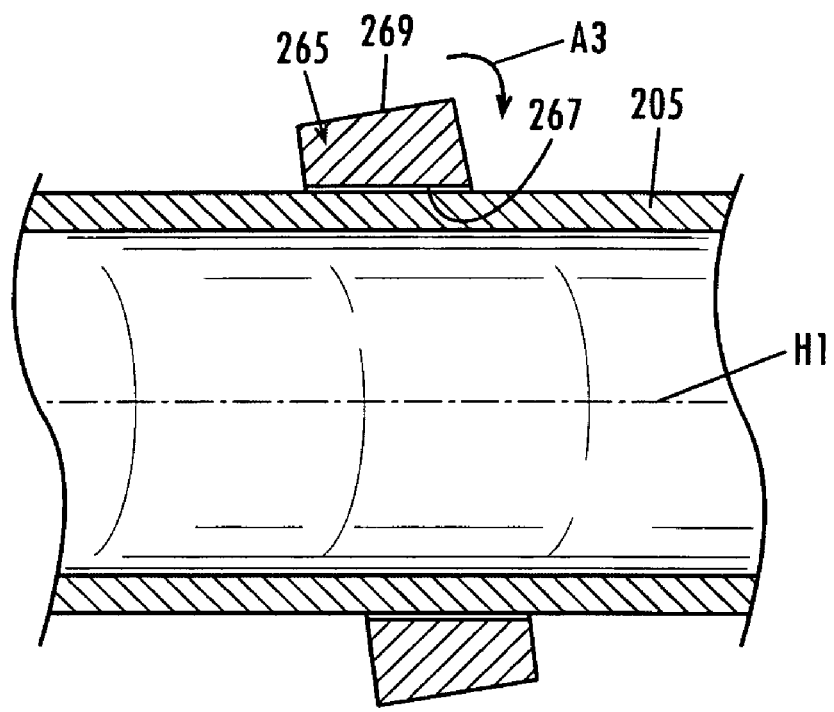
Figure 11:
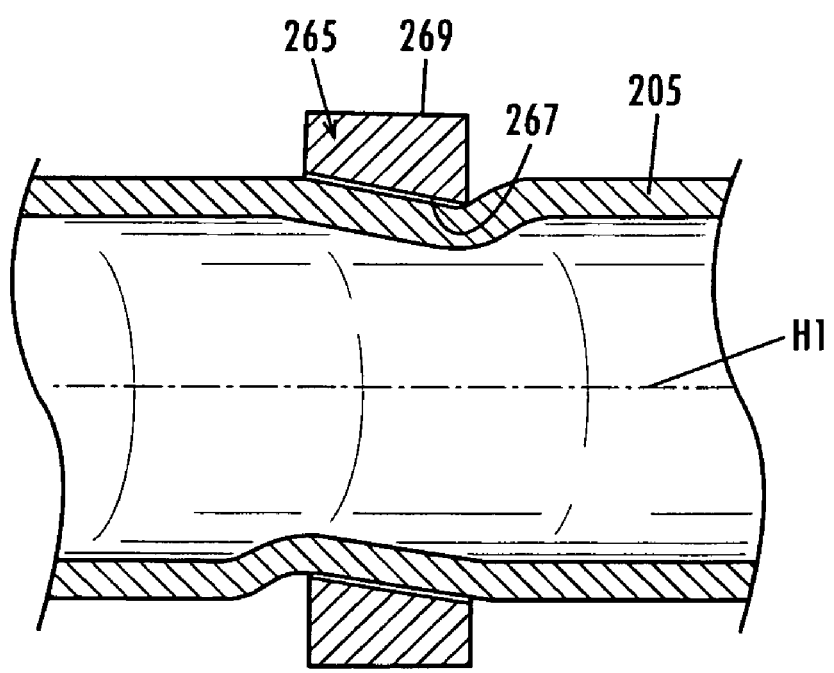
Figure 12A:
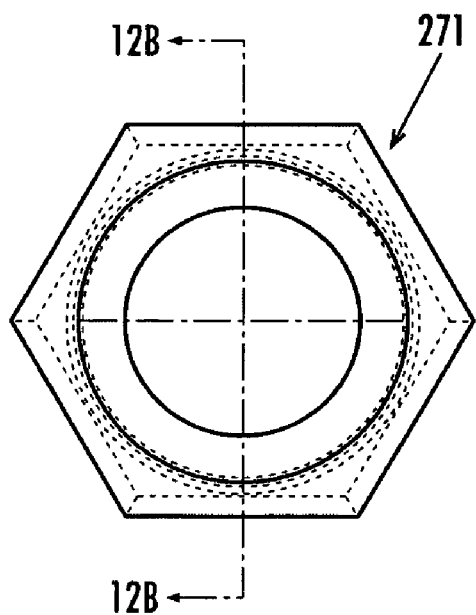
Figure 12B:
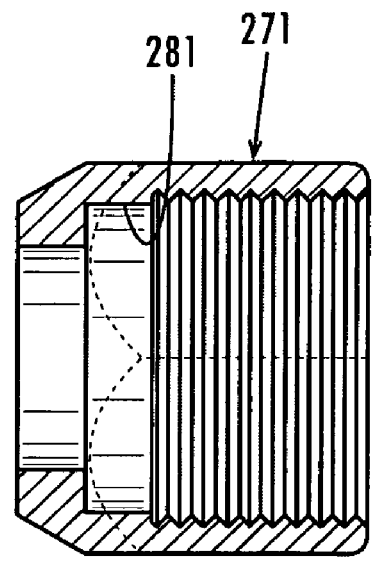
Figure 12C:
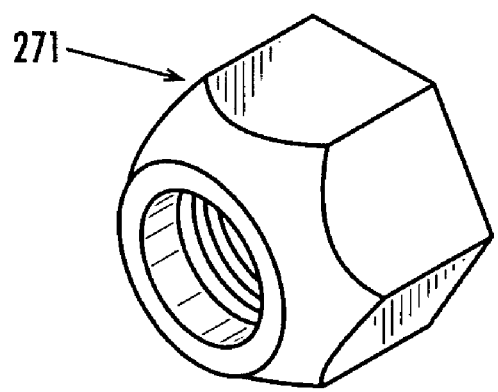
Figure 13A:
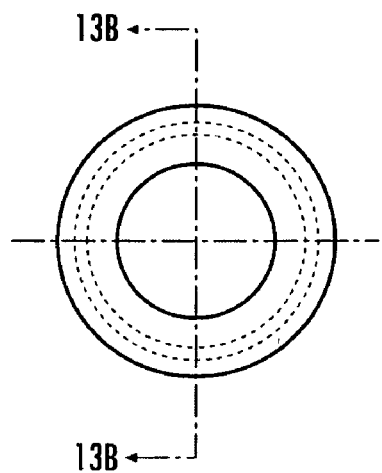
Figure 13B:
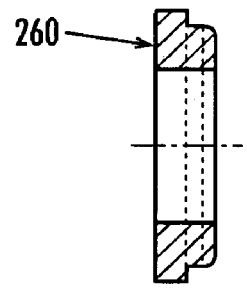
Figure 13C:
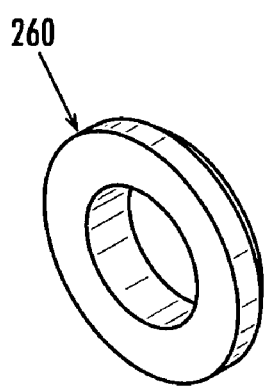
Figure 14:
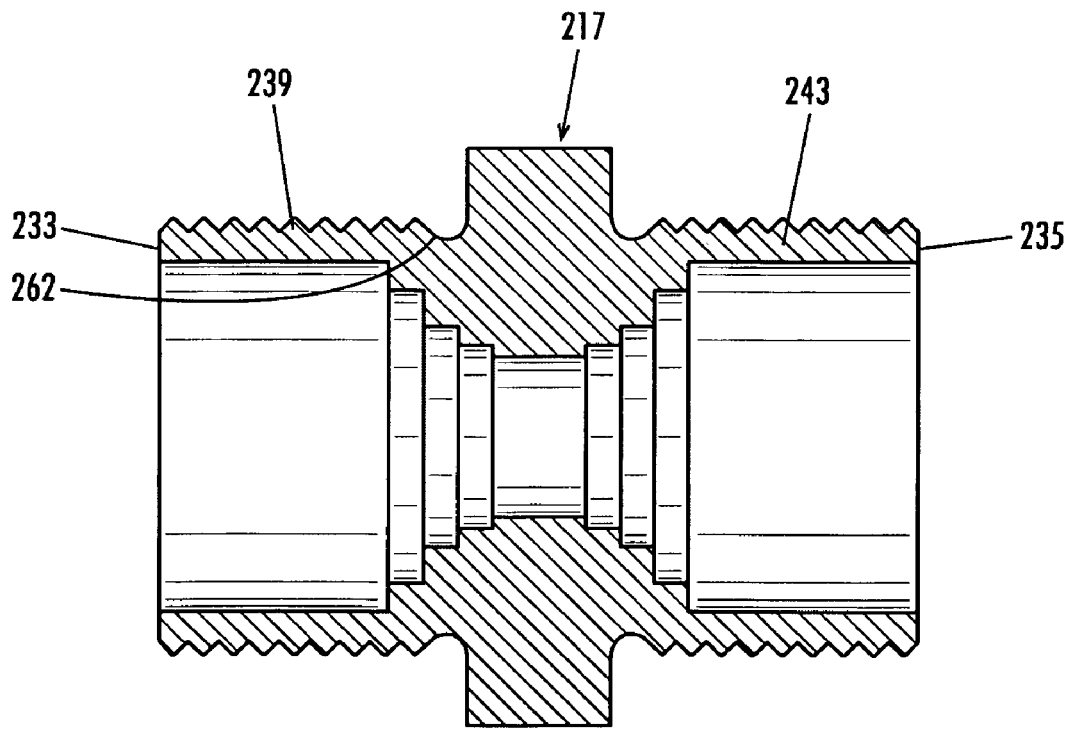

A locking ring 265 surrounds the fluid line 205 outbound of the sealing ring 260. The locking ring 265, sealing ring 260 and annular seal 241 are captured by a nut 271 that is threadably connected to the first socket 239. As shown in FIG. 9, the locking ring 265 has a bore with an angled or skewed inner surface 267, which has an axis that forms an angle A1 relative to an line of reference H1 passing through the center of the locking ring. As illustrated in cross-section of FIG. 9, the locking ring 265 has an outer surface 269 that is generally cylindrical and parallel to the line of reference H1. As shown in FIG. 10, the locking ring 265 is initially positioned around the first fluid line 205 that is arranged for insertion into the connector 201 in an orientation wherein the fluid line is generally parallel to the reference line H1. The locking ring 265 initially is positioned around the first fluid line 205 with its outer surface 269 angled relative to the horizontal line H1 and its inner surface 267 aligned generally parallel with the reference line H1. In this configuration, the inner surface 267 is in relatively loose surface-to-surface contact with the first fluid line. In other words, when the angled bore of the locking ring 265 is slid over the end of the fluid line 205, the locking ring is canted or skewed relative to the fluid line. The locking ring 265 is in sliding contact with the outer surface of the first fluid line 205 so that the locking ring can be axially slid and positioned along the first fluid line prior to insertion of the fluid line in the connector 201.

The end of the first fluid line 205 having, in order, the annular seal 245, the sealing ring, the locking ring 265, and the nut 271 slid thereon, is inserted into the first socket 239. Next, the nut 271 is slid to and threadably secured on the first socket 239 to urge the locking ring 265 axially against sealing ring 260. As the nut 271 is further tightened moving it further in the direction of arrow A2 (FIG. 7) the flat inner surface 281 of the nut 271 engages the now angled or canted outer surface 269 of the locking ring 265. Further tightening and axial movement of the nut 271 in the direction of arrow A2 forces the flat surface 281 of the nut 271 against the angled surface 269 of the locking ring 265 causing the locking ring to be forcibly rotated from its canted orientation in the direction of arrow A3 (FIG. 10) to an uncanted orientation shown in FIG. 11.

When the locking ring 265 is forced in the direction of arrow A3 (FIG. 10) by the tightening of the nut 271, the angled inner surface 267 of the locking ring contacts and clamps tightly onto the outer surface of the fluid line 205 to deform the fluid line slightly inward and provide a secure mechanically locked clamping force on the fluid line. It may also be said that the clamping ring "digs in" to the fluid line as the nut is tightened. In any event, the clamping force causes the wall of the fluid line 205 to be pressed inward slightly, or, the locking ring presses or digs into the outer surface of the fluid line slightly, such that the locking ring 265 mechanically locks the fluid line in place. The clamping of the locking ring 265 on the fluid line 205 also causes the sealing member 260 to be pressed against and compress the annular seal 241 on the end of the fluid line to expand the walls of the seal and form a fluid-tight seal around the fluid line.

It is understood that the second fluid line 207 is held in place and sealed in the second socket 243 of the connector 201 in a similar manner, and with similar components, as described above for securing the first fluid line 205 to the first socket 239. Further, the connector 201 can be modified to include a filter (e.g., the filter 121 of the first embodiment) housed in a body having an enlarged cavity. Further, the connector 201 may be modified for use as a "T" connector, "X" connector, or other connector for connecting more than two fluid lines as discussed above with respect to the first embodiment.

Figure 15:
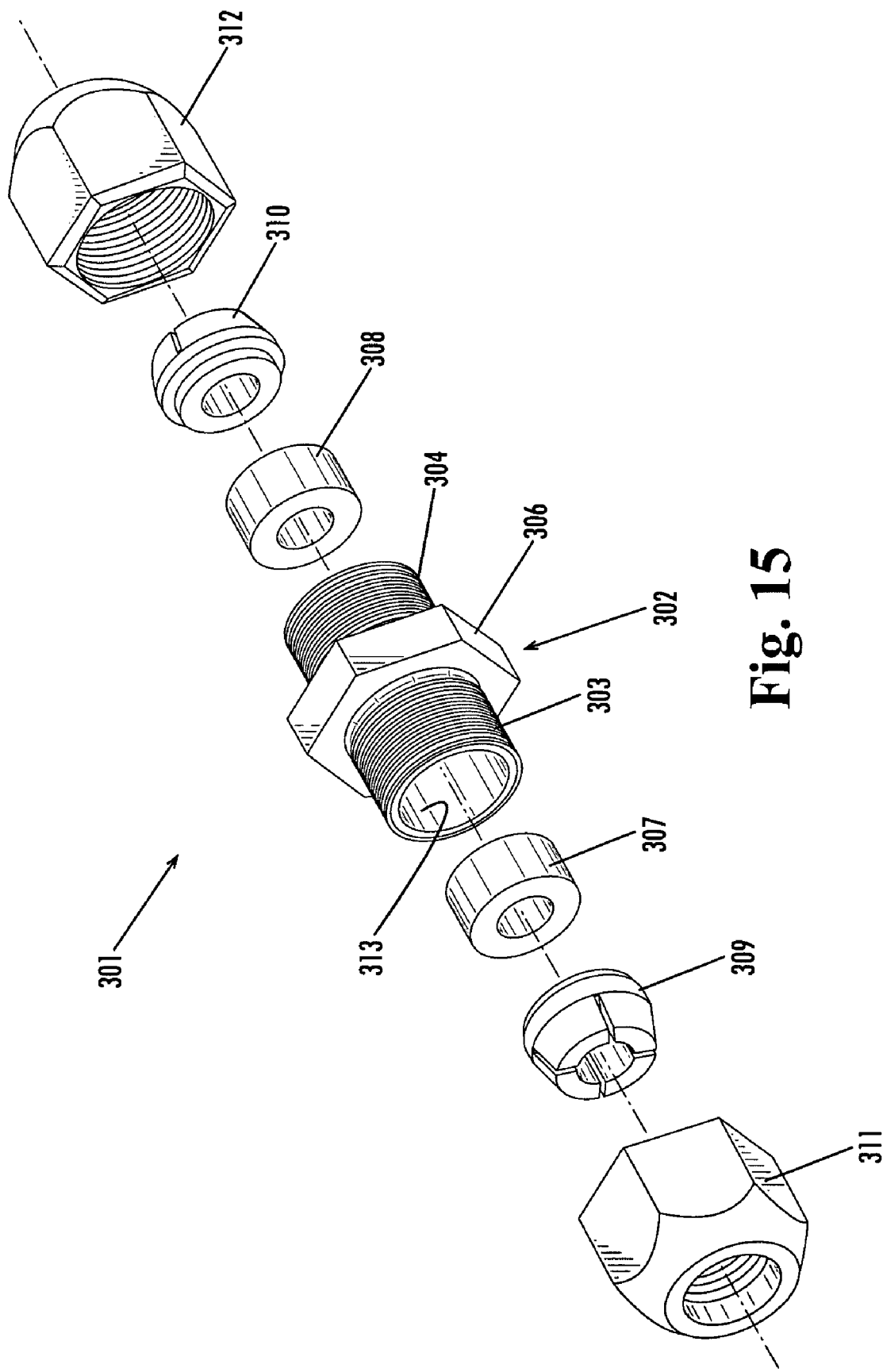
FIGS. 15-18 depict yet another embodiment of the invention.
Figure 16:
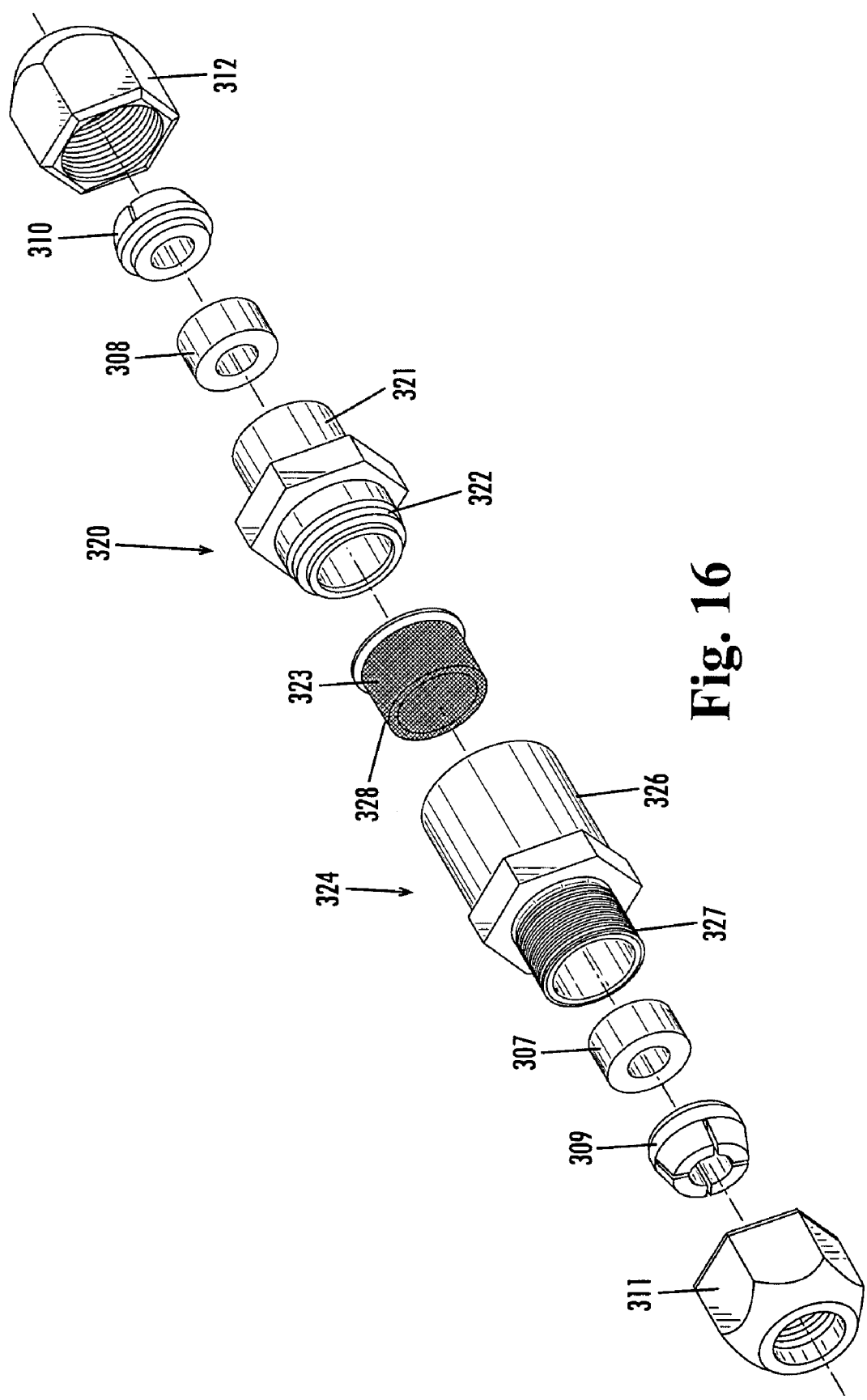
Figure 17:
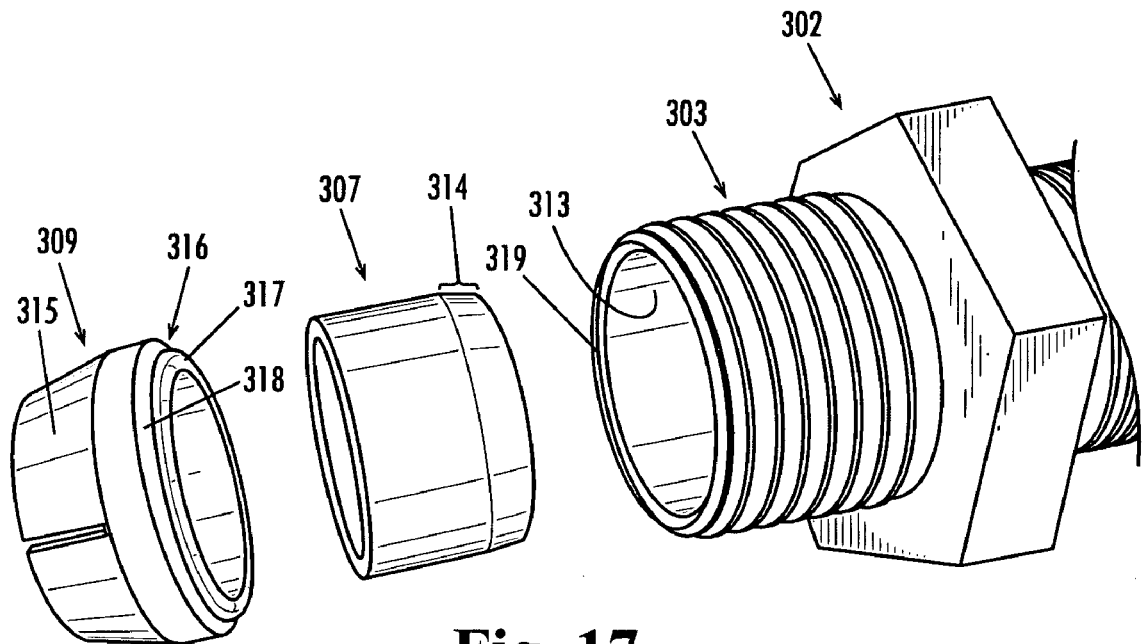
Figure 18:
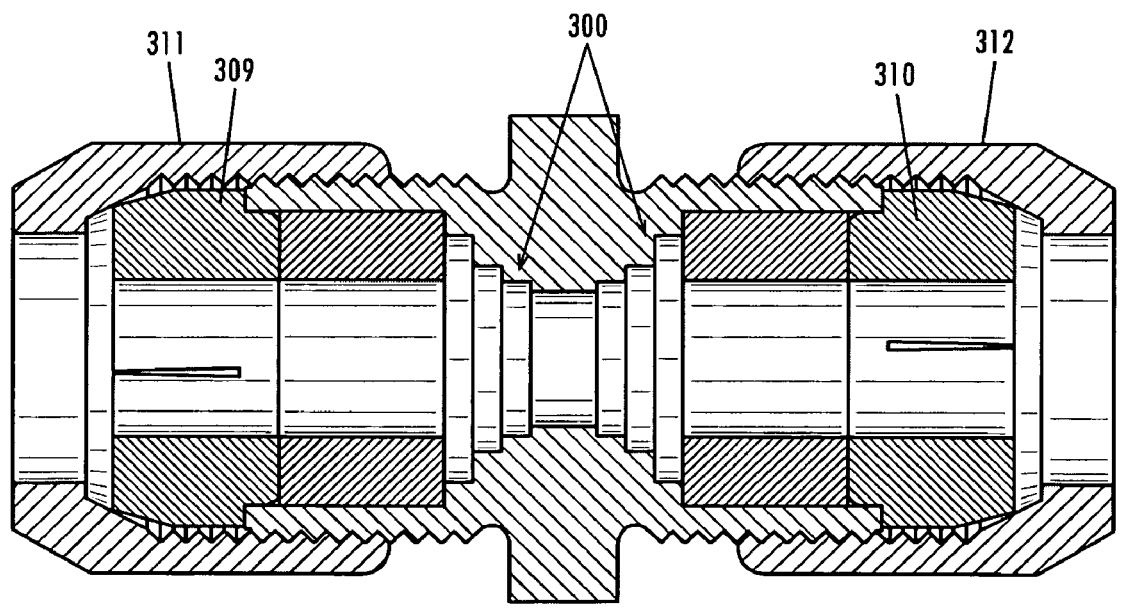

FIGS. 15-17 illustrate yet another alternate embodiment of the invention and represent a best mode of carrying out the invention. FIG. 15 illustrates a version of the invention intended simply for connecting or splicing two fluid lines together and FIG. 16 illustrates a fluid line connector with the addition of an integrated fluid filter. Preferred configurations of various components according to this embodiment of the invention are shown. Many of the components are the same as or similar to those of previously described embodiments and, where such is the case, detailed descriptions will not be provided again here.

Referring to FIG. 15, a fluid line connector 301 comprises a generally cylindrical body 302 having treaded ends 303 and 304 on either side of a hex nut 306. The body is provided with a central bore or passageway 313, each end of which is sized to receive a respective annular seal 307 or 308 in snug-fitting relationship. The annular seals 307 and 308 are fabricated of a resilient rubberized material as in previously described embodiments. Combined ferrule and sealing ring member 309 resides adjacent annular seal 307 on one end of the fluid connector and is captured, when the connector is assembled, between the end of annular body 302 and threadable cap or nut 311. Similarly, combined ferrule and sealing ring member 310 resides adjacent annular seal 308 on the other end of the fluid connector and is captured, when the connector is assembled, between the other end of annular body 302 and threadable nut 312.

The combined ferrules and sealing ring members 309 and 310 will be described in more detail below. In general, however, these elements can be provided in various sizes (i.e. with various diameter central bores) to accommodate fluid lines of different diameters and each combined ferrule and sealing ring member preferably is formed of and alloy containing brass or another appropriate sufficiently soft metal or alloy. The seals are formed of an appropriate resilient material such as natural or synthetic rubber, appropriate polymer materials, combinations of same, any of the materials identified above relative to other embodiments, or any other material that exhibits the desired resiliency and sealing properties.

FIG. 17 illustrates combined ferrule and sealing ring member 309 and annular seal 307 in more detail. One end of ferrule and sealing ring member 309 forms a tapered and slotted ferrule that is engaged by the interior surface of nut 311 when tightened to compress, collapse, and clamp the ferrule tightly around one end of a fluid line. In this regard, the inner surfaces of the nuts 311 and 312 are formed with frustroconical sections that engage and compress the slotted ferrules inwardly when the nuts are tightened. The other end 316 of ferrule and sealing ring member 309 is configured to define a seal compression ring 317, or just sealing ring 317, and an annular lip 318. The outer diameter of the sealing ring 317 is selected so that the sealing ring 316 fits snuggly but slidably within the end of bore 313 of the body 302 when the connector is assembled. The annular lip 318 has an outer diameter greater than the diameter of the bore 313 and thus limits the extension of seal compression ring 316 into the bore 313 by seating against the rim 319 of the threaded end 303 of body 302.

Annular seal 307 is formed of an appropriate resilient compressible sealing material and has an inner bore sized to receive snuggly the end of a fluid line and an outer diameter sized to slip snuggly inside the bore 319 of body 302. The end 314 of annular seal 307 preferably is slightly tapered to ease the movement of the seal into the bore 313 and to form better sealing contact with the interior lip of the bore 262 (FIG. 17). Finally, the length of the annular seal 307 is selected so that when the seal is fully inserted into the bore 313, the rim of the seal resides at the level of or just below the plane of rim 319. In this way, when the sealingn ring 317 moves into the end of the bore 313 as the nut 311 is tightened, it compresses the annular seal 307 completely within the confines of the bore 313. Thus no portion of the annular seal 307 can expand axially in response to the compressive force of the sealing ring 317. Virtually all of the resulting expansion is radial expansion or thickening of the walls of the seal 307. This expansion, in turn, compresses the seal 307 tightly against the bore 313 and tightly against the fluid line to form a seal around the fluid line of the highest integrity and reliability.

FIG. 16 illustrates an embodiment of the just described fluid line connector that includes the addition of an integral in-line filter element for filtering fluid flowing through fluid lines that have been connected together using the invention. In this embodiment, the left end of body 320 is modified for threadably receiving an internally threaded end of a filter holder 324. The modified end has threads sized to mesh with the internal threads of the filter holder and is provided with one or more O-rings or other appropriate seals 323 for sealing against the inside surface of the filter holder 324 when the filter holder is threaded onto the body 320. The filter holder 324 has an internal cavity sized and configured to receive and hold a thimble filter 328 in-line with the flow of fluid.

The distal end of the filter body 324 has the same configuration as an end of the body 302 in the embodiment of FIG. 15 in order to receive the same annular seal 307, combined ferrule and sealing ring member 309, and nut 311 as used with the simple splice connector of FIG. 15. Thus, with a slightly modified body 320 and the addition of a filter holder 324 and filter 328, the simple splice connector of FIG. 15 is converted into a connector and in-line fluid filter. Accordingly, repairing a fluid line such as an automotive air conditioning refrigerant line with the connector of FIG. 16 provides the added enhancement that the fluid is filtered following the repair.

FIG. 17 is a cross-sectional view of the splice connector of FIG. 15 and illustrates the frustroconical inner surface of the nuts 311 and 312 compressing and collapsing the slotted ferrules 309 and 310 inwardly to clamp onto a pipe. Also shown is the sealing ring 317 (FIG. 16) compressing the seal. Further the body 302 is formed on its interior with a series of stepped annular rims or lips or shoulders generally indicated at 300. Each shoulder is sized so that a fluid line of a corresponding diameter bottoms out on the shoulder when inserted into the connector. In this way, a standard connector body may be used with a variety of fluid line sizes with only the seal and combination ferrule and sealing ring member being sized to accommodate each size line.

All dimensional information presented herein and included in the drawings is intended to be illustrative and not intended to limit the scope of the invention.

The foregoing description of the invention illustrates and describes various embodiments considered to represent best modes of carrying out the invention. As various changes can be made in the above embodiments without departing from the scope of the invention, it is intended that all matter contained in the above description or shown in the accompanying drawings shall be interpreted as illustrative and not limiting. Furthermore, the scope of the invention covers various modifications, combinations, alterations, etc., of the above-described embodiments that all are within the scope of the claims. Additionally, the disclosure shows and describes only selected embodiments of the invention, but the invention is capable of use in various other combinations, modifications, and environments and is capable of changes or modifications within the scope of the inventive concept as expressed herein, commensurate with the above teachings, and/or within the skill or knowledge of artisans in the relevant art. Furthermore, certain features and characteristics of each embodiment may be selectively interchanged and applied to other illustrated and non-illustrated embodiments of the invention without departing from the scope of the invention. The term "fluid" used herein is intended to encompass gasses as well as liquids such that the invention is equally applicable to coupling fluid lines that convey gases and liquids.

What is claimed is:

1. A fluid line connector comprising:
   a body having an externally threaded first end terminating in a rim, an externally threaded second end terminating in a rim, and a central axial passageway;
   a first seal shoulder projecting inwardly from the central passageway and positioned at a first distance from the first end of the body;
   a second seal shoulder projecting inwardly from the central passageway and positioned at a second distance from the second end of the body;
   an annular first seal sized to be received in the axial passageway at the first end of the body, the annular first seal having a first axial end, a length, and a second axial end, the length being substantially the same as the first distance such that the second axial end of the annular first seal resides substantially at a plane defined by the rim at the first end of the body when the annular first seal is disposed in the axial passageway with its first axial end abutting the first seal shoulder;
   an annular second seal sized to be received in the axial passageway at the second end of the body, the annular second seal having a first axial end, a length, and a second axial end, the length being substantially the same as the second distance such that the second axial end of the annular second seal resides substantially at a plane defined by the rim at the second end of the body when the annular second seal is disposed in the axial passageway with its first axial end abutting the second seal shoulder;
   a first ferrule and sealing ring member having one portion that defines a generally annular first sealing ring sized to extend into the axial passageway at the first end of the body and to engage the second axial end of and compress an annular first seal disposed therein, and another portion that defines a tapered and slotted first ferrule;
   a second ferrule and sealing ring member having one portion that defines a generally annular second sealing ring sized to extend into the axial passageway at the second end of the body and to engage the second axial end of and compress an annular second seal disposed therein, and another portion that defines a tapered and slotted second ferrule;
   a first nut threadable onto the first end of the body to capture the first ferrule and sealing ring member between the first nut and the annular first seal;
   a second nut threadable onto the second end of the body to capture the second ferrule and sealing ring member between the second nut and the annular second seal;
   the first nut being internally configured such that when the first nut is tightened onto the first end of the body, the first sealing ring is urged into the axial passageway and against the second axial end of the annular first seal to compress the annular first seal within the axial passageway at the first end of the body and to collapse the slotted first ferrule radially inwardly for gripping a fluid line; and
   the second nut being internally configured such that when the second nut is tightened onto the second end of the body, the second sealing ring is urged into the axial opening and against the second axial end of the annular second seal to compress the annular second seal within the axial passageway at the second end of the body and to collapse the slotted second ferrule radially inwardly for gripping a fluid line.

2. A fluid line connector as claimed in claim 1 and wherein the annular first and second seals are formed of a resilient material.

3. A fluid line connector as claimed in claim 2 and wherein the resilient material is a rubberized material.

4. A fluid line connector as claimed in claim 1 and wherein the first and second sealing rings have an outer diameter smaller than a diameter of the axial passageway at the first and second ends of the body respectively such that the first and second sealing rings move into the axial passageway at respective ends of the body when compressing the first and second seals.

5. A fluid line connector as claimed in claim 1 and wherein the first and second ferrule and sealing ring members are formed of an alloy containing brass.

6. A fluid line connector as claimed in claim 1 and wherein the configuration of the interior of the nuts comprises a frustoconical section for engaging and collapsing the first and second ferrules respectively.

7. A fluid line connector as claimed in claim 1 and wherein the annular first and second annular seals and the first and second ferrule and sealing ring members have an internal diameter sized to receive an end of a respective fluid line.

8. A fluid line connector as claimed in claim 1 and further comprising a filter holder threaded onto the first end of the body, the filter holder having a threaded distal end and a filter disposed within the filter holder, the first seal, the first ferrule and sealing ring member, and the first nut being mounted at the distal end of the filter holder.

9. A fluid line connector as claimed in claim 8 and wherein the filter is a thimble filter.

10. A fluid line connector as claimed in claim 1 and wherein the passageway is formed with at least two inwardly projecting spaced fluid line shoulders of different diameters each shoulder for engaging an end of a fluid line of a corresponding diameter inserted through the passageway from one end of the body.

11. A fluid line connector as claimed in claim 10 and wherein the passageway is formed with at least two inwardly projecting spaced fluid line shoulders of different diameters each shoulder for engaging an end of a fluid line of a corresponding diameter inserted through the passageway from the other end of the body.

12. A fluid line connector comprising a body have a central passageway and threaded ends terminating in rims for receiving respective ends of fluid lines to be connected, the fluid line connector including a sealing and clamping mechanism for securing and sealing the ends of the fluid lines, the sealing and clamping mechanism comprising:

a pair of generally cylindrical compressible seals fabricated of a resilient material and being disposed in the passageway at respective threaded ends thereof;

the generally cylindrical seals each having an end located substantially at the rim of a threaded end of the passageway when the seal is not compressed;

a pair of compression nuts a pair of compression nuts having central openings and being threaded onto respective threaded ends of the body, the openings in said compression nuts generally aligning with the passageway in the body; and a pair of ferrule and sealing ring members having central openings, each ferrule and sealing ring member being captured between a respective compression nut and a respective cylindrical seal;

each ferrule and sealing ring member being formed with a sealing ring portion configured to compress the adjacent seal when the compression nut is tightened and a ferrule portion configured to be collapsed radially inwardly to clamp onto the end of a fluid line when the compression nut is tightened; and at least two spaced apart fluid line shoulders of different diameters projecting inwardly from the central passageway between the pair of generally cylindrical seals, each shoulder for engaging an end of a fluid line of a corresponding diameter inserted through the generally cylindrical seal from the other end of the body.

13. A fluid line connector as claimed in claim 12 and wherein the ferrule portions are inwardly tapered and wherein the compression nuts are formed with a frustroconical interior wall for engaging and collapsing the inwardly tapered ferrule portions.

14. A fluid line connector as claimed in claim 13 and wherein the ferrule portions are slotted.

15. A fluid line connector as claimed in claim 12 and wherein the sealing ring portions are sized to slide into the ends of the passageway to compress the seals when the compression nuts are tightened.

16. A fluid line connector comprising:
a body having an externally threaded first end and a second end;

a cylindrical passageway extending into the body from the first end thereof and defining a rim at the first end of the body, the cylindrical passageway having an inner diameter;

a seat projecting radially inwardly from within the cylindrical passageway, the seat being spaced a first distance from the rim;

a cylindrical seal having a first end, a second end, a length, an outer diameter, and an inner diameter;

the outer diameter of the cylindrical seal being selected to allow the cylindrical seal to be received into the cylindrical passageway with its first end engaging the seat;

the length of the cylindrical seal being substantially the same as the first distance such that the second end of the cylindrical seal is located substantially at the rim when the cylindrical seal is received in the cylindrical passageway;

a ferrule and sealing ring member having one portion that defines a generally annular sealing ring member sized to extend into the cylindrical passageway at the first end of the body and to engage the second end of the cylindrical seal for compressing the seal within the passageway, and another portion that defines a tapered and slotted ferrule; and an internally threaded compression nut configured to be threaded onto the externally threaded first end of the body to urge the sealing ring member progressively into the passageway to compress a seal therein between the sealing ring and the seat and to compress the ferrule radially inwardly for cinching about a fluid line extending through the ferrule.

17. A fluid line connector as claimed in claim 16 wherein the cylindrical passageway extends through the second end of the body.

18. A fluid line connector as claimed in claim 17 wherein:
the passageway defines a rim at the second end of the body, the cylindrical passageway having a second inner diameter at the second end of the body;

a second seat projecting radially inwardly from within the cylindrical passageway, the seat being spaced a second distance from the rim at the second end of the body;

a second cylindrical seal having a first end, a second end, a length, an outer diameter, and an inner diameter;

the outer diameter of the second cylindrical seal being selected to allow the second cylindrical seal to be received into the cylindrical passageway at the second end of the body with the first end of the second cylindrical seal engaging the second seat;

the length of the second cylindrical seal being substantially the same as the second distance such that the second end of the cylindrical seal is located substantially at the rim at the second end of the body when the second cylindrical seal is received in the cylindrical passageway at the second end of the body;

a second ferrule and sealing ring member having one portion that defines a generally annular second sealing ring member sized to extend into the cylindrical passageway at the second end of the body and to engage the second end of the second cylindrical seal for compressing the second cylindrical seal within the passageway, and another portion that defines a tapered and slotted ferrule; and an internally threaded second compression nut configured to be threaded onto the externally threaded second end of the body to urge the second cylindrical seal progressively into the passageway at the second end of the body to compress a second cylindrical seal therein between the second sealing ring and the second seat and to compress the second ferrule radially inwardly for cinching about a fluid line extending through the second ferrule.

* * * * *